(12) United States Patent
Kashyap

(10) Patent No.: US 10,534,910 B1
(45) Date of Patent: Jan. 14, 2020

(54) USING THREAT MODEL TO MONITOR HOST EXECUTION

(71) Applicant: Bromium, Inc., Cupertino, CA (US)

(72) Inventor: Rahul C. Kashyap, Foster City, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 196 days.

(21) Appl. No.: 15/711,472

(22) Filed: Sep. 21, 2017

Related U.S. Application Data

(60) Provisional application No. 62/404,123, filed on Oct. 4, 2016.

(51) Int. Cl.
*G06F 21/57* (2013.01)
*G06F 21/55* (2013.01)
*G06F 9/455* (2018.01)
*H04L 29/06* (2006.01)
*G06F 21/56* (2013.01)

(52) U.S. Cl.
CPC ........ *G06F 21/554* (2013.01); *G06F 9/45558* (2013.01); *G06F 21/552* (2013.01); *G06F 21/577* (2013.01); *H04L 63/1433* (2013.01); *G06F 21/56* (2013.01); *G06F 2009/45587* (2013.01); *H04L 63/1425* (2013.01)

(58) Field of Classification Search
CPC .. G06F 21/5554; G06F 21/552; G06F 21/577; G06F 21/56; H04L 63/1433
USPC ...................................................... 726/22, 23
See application file for complete search history.

(56) References Cited

U.S. PATENT DOCUMENTS

| | | | | |
|---|---|---|---|---|
| 8,225,317 B1* | 7/2012 | Chiueh | ................... | G06F 9/455 713/164 |
| 8,898,775 B2* | 11/2014 | Ye | .......................... | G06F 21/566 726/22 |
| 9,336,385 B1* | 5/2016 | Spencer | .............. | H04L 63/1441 |
| 2009/0070876 A1* | 3/2009 | Kim | ......................... | G06F 21/56 726/23 |
| 2010/0293615 A1* | 11/2010 | Ye | .......................... | G06F 21/566 726/22 |
| 2012/0216244 A1* | 8/2012 | Kumar | .................... | G06F 21/31 726/1 |
| 2012/0255012 A1* | 10/2012 | Sallam | .................... | G06F 21/52 726/24 |

(Continued)

*Primary Examiner* — Venkat Perungavoor
*Assistant Examiner* — Peiliang Pan
(74) *Attorney, Agent, or Firm* — HPI Patent Department

(57) ABSTRACT

Approaches for monitoring a host operating system. A threat model is stored and maintained. The threat model identifies for any process executing on a host operating system how trustworthy the process should be deemed based on a pattern of observed behavior. The execution of the process and those processes in a monitoring circle relationship thereto are monitored. The monitoring circle relationship includes a parent process, any process in communication with a member of monitoring circle relationship, and any process instantiated by a present member of monitoring circle relationship. Observed process behavior is correlated with the threat model. Upon determining that a particular process has behaved in a manner inconsistent with a pattern of allowable behavior identified by the threat model for that process, a responsive action is taken.

17 Claims, 4 Drawing Sheets

(56) References Cited

U.S. PATENT DOCUMENTS

| | | | |
|---|---|---|---|
| 2013/0073600 A1* | 3/2013 | Jenkins | G06F 9/5027 |
| | | | 709/201 |
| 2015/0033341 A1* | 1/2015 | Schmidtler | H04L 63/1425 |
| | | | 726/23 |
| 2015/0172300 A1* | 6/2015 | Cochenour | H04L 63/145 |
| | | | 726/23 |
| 2016/0164891 A1* | 6/2016 | Satish | G06F 16/285 |
| | | | 726/1 |
| 2017/0024561 A1* | 1/2017 | Hajmasan | G06F 21/55 |
| 2019/0158517 A1* | 5/2019 | Muddu | G06F 16/254 |

* cited by examiner

US 10,534,910 B1

USING THREAT MODEL TO MONITOR HOST EXECUTION

CLAIM OF PRIORITY

This applications claims priority to U.S. Provisional Patent Application Ser. No. 62/404,123, entitled "Using Threat Model to Monitor Host Execution," filed on Oct. 4, 2016, the disclosure of which is hereby incorporated by reference for all purposes as if fully set forth herein.

FIELD OF THE INVENTION

Embodiments of the invention relate to the monitoring of processes executing in a host operating system for observance of suspicious behavior.

BACKGROUND

A great deal of time, money, and effort is spent in the fight against security risks, such as viruses, malware, exploits, intrusions, and other dangers to enterprise computing. A malware infection may require a compromised system to be erased and re-imaged to remove the malware, which can also result in great expenditures of time and money as well as loss of productivity.

While terms such as viruses, malware, and exploits may have specific definitions in the art, as used herein the term "malware" shall refer to any type of computer code and/or other data introduced from outside a computer system or network of computers that may be used to damage or otherwise cause aspects of the computer system or network of computers to malfunction or perform in an unintended manner. Thus, as used herein, the term "malware" encompasses viruses, exploits, worms, and any type of programmatic security risk.

Malware may be introduced into a computer network through a wide variety of avenues, such as email or a malformed JPEG or other code on a web page that is downloaded to a computer via a web browser. Malware generally follows a common lifecycle; namely, the malware will exploit a weakness in the computer system or network, the malware will drop and execute a payload, the malware will attempt to escalate its privileges, the malware will take steps to persist on the system and/or network despite efforts to remove it, and finally the malware will propagate to other computers. If the malware is unable to be detected using current approaches, then countermeasures cannot be enacted and systems may become infected.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for monitoring the execution of a host operating system to ensure that all processes executing on the host operating system conform to specified behavioral norms are presented herein. In the following description, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Figure 1:
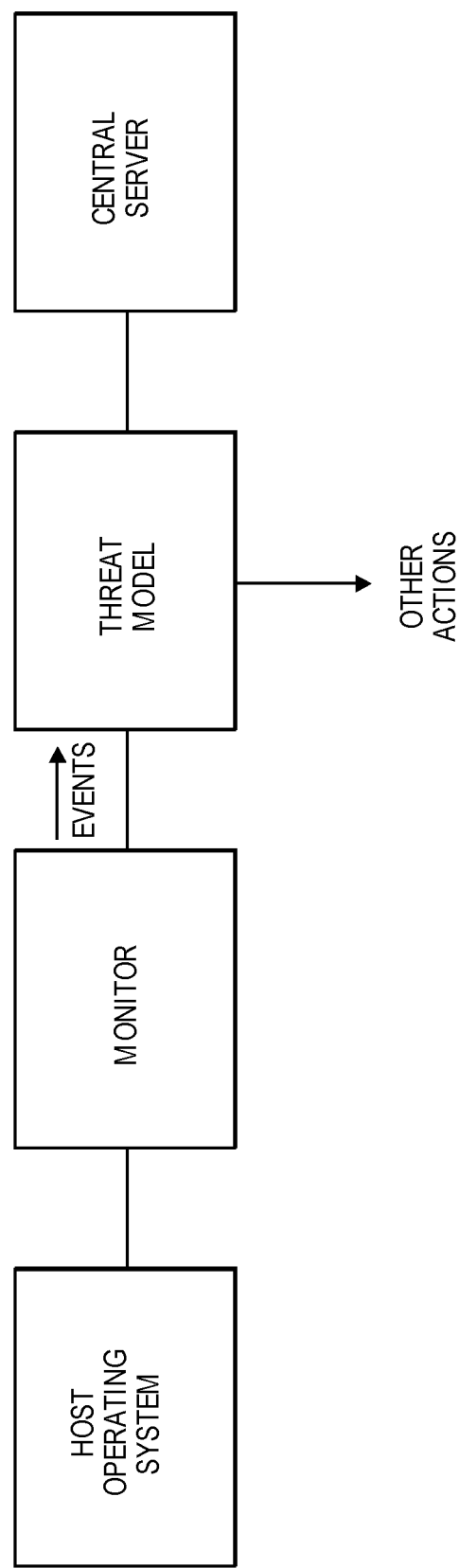
FIG. 1 a block diagram illustrating a flow of information according to an embodiment of the invention.

Approaches for monitoring the execution of a host operating system to ensure that its execution conforms to behavioral norms shall be discussed herein in relation to different embodiments. FIG. 1 a block diagram illustrating functional components of an embodiment of the invention. A monitor is a software component which observes execution of a host operating system. The monitor may execute within the same host operating system which is being observing by the monitor As a result of observing the host operating system, the monitor will generate a set of events which are supplied, either synchronously or periodically, as input to a threat model. The thread model is a software component that compares the received set of events against a model of expected or allowable behavior for executable code, interpreted data, and user actions. The events supplied to the threat model are correlated against the model to determine whether any process executing in the host operating system is behaving in a manner inconsistent with a pattern of allowable behavior identified by the threat model for that process. Upon determining that a process is behaving in an uncharacteristic or expected manner, the threat model may instruct that one or more of a plurality of responsive actions be taken, such as but not limited to notifying a central server, performing additional monitoring of host operating system activity, persistently storing a record of activity occurring within the host operating system, and blocking certain activity at the file and/or network level.

Approaches discussed herein also make use of monitoring circle relationships to ensure any processes related to a process being monitored are themselves monitored. A monitoring circle relationship is more inclusive than merely a parent child relationship, as a monitoring circle relationship includes the parent process to a process being monitored, any process in communication with a member of the monitoring circle relationship, and any process instantiated by a present member of the monitoring circle relationship. In this way, if a first process being monitored communicates with a second process, and the second process subsequently creates a child process, then the child process of the second process will be in a monitoring circle relationship with the first process under the policy rationale that the first process may have caused or influenced the second process to instantiate the child process, and so the child process should be monitored in conjunction with the first process for possible collusion.

System Overview

Figure 2:
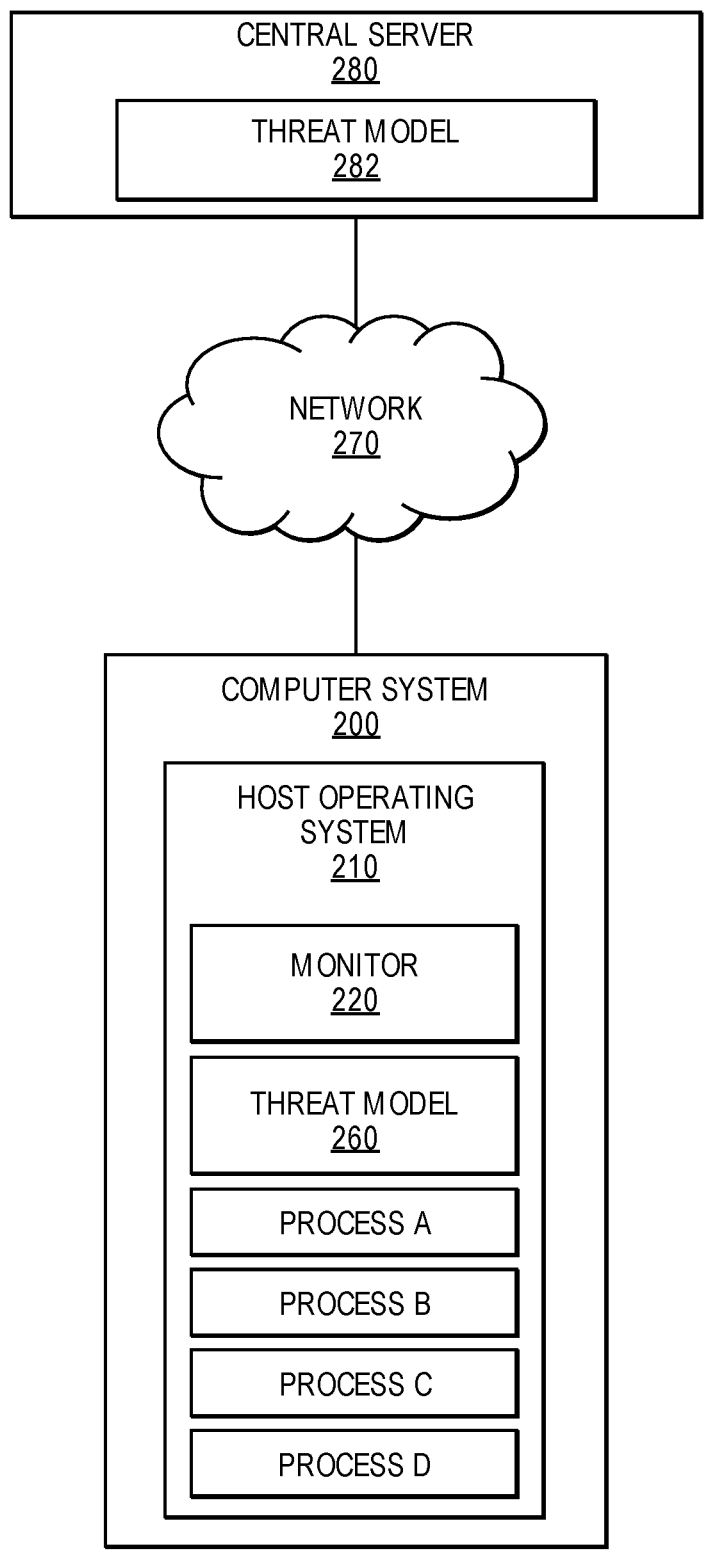
FIG. 2 is a block diagram of a system for monitoring the execution of processes in a host operating system for observance of suspicious behavior without the use of virtualization according to an embodiment of the invention.

FIG. 2 is a block diagram of a system for monitoring the execution of processes in a host operating system for observance of suspicious behavior according to an embodiment of the invention. The system of FIG. 2 includes a computer system 200, a network 270, and a central server 280. Note that computer system 200 may, but need not, employ or support virtualization.

Computer system 200, as broadly used herein, refers to any type of computer system capable of executing a host operating system 210. For example, computer system 200 may correspond to a personal computer (PC), a laptop computer, a tablet computer, a cell phone, a portable computing device, and the like.

Host operating system 210 refers to the default operating system loaded by computer system 200 upon being powered on. A plurality of different processes may by executed by host operating system 210. Four such example processes executing in host operating system 210 are depicted in FIG. 2A as processes A, B, C, and D. Processes A, B, C, D shall be referred to below in the description of several examples of particular embodiments of the invention.

Monitor 220 is a software component which observes execution of a host operating system. As a result of observing host operating system 210, monitor 220 generates data describing a set of events (event data) which is supplied as input to threat model 260.

In an embodiment, monitor 220 may be implemented by one or more drivers which do not appear on a list of drivers loaded by host operating system 210. In such an embodiment, if host operating system 210 were instructed to display a list of loaded drivers, then the drivers implementing monitor 220 would not appear the list of drivers loaded by host operating system 210. The motivation for rendering the drivers implementing monitor 220 incognito from a user perspective is dissuade any malicious users from tampering with or disabling monitor 220.

Threat model 260 is a software component that models expected or allowable behavior of executable code, interpreted data, and user actions. Threat model 260 receives event data from monitor 220 and correlates the event data to determine whether any process executing in host operating system 210 is behaving in a manner inconsistent with a pattern of allowable behavior identified by threat model 260 for that process. Threat model 260 may perform or instruct a plurality of responsive actions if a particular process is determined to be behaving outside of behavioral norms modeled by threat model 260.

Threat model 260 may define a set of allowable behavior for processes having certain characteristics while executing in host operating system 210. The set of allowable behavior for the particular process may be based, at least in part, upon characteristics inherited from the parent process and other members of a monitoring circle relationship. Embodiments of the invention may implement threat model 260 using techniques discussed in U.S. Pat. No. 9,223,962, entitled "Micro-Virtual Machine Forensics and Detection," invented by Rahul C. Kashyap et al., the contents of which are hereby incorporated by reference for all purposes as if fully set forth herein. Embodiments of the invention may implement threat model 260 using techniques discussed in U.S. Pat. No. 9,092,625, entitled "Micro-Virtual Machine Forensics and Detection," invented by Rahul C. Kashyap et al., the contents of which are hereby incorporated by reference for all purposes as if fully set forth herein. Embodiments of the invention may implement threat model 260 using techniques discussed in U.S. patent application Ser. No. 14/809,014, entitled "Micro-Virtual Machine Forensics and Detection," invented by Rahul C. Kashyap et al., the contents of which are hereby incorporated by reference for all purposes as if fully set forth herein.

Network 270 represents any type of private or public computer network, such as for example the Internet.

Central server 280 represents a computer system accessible over network 270 computer system 200 in FIG. 2. An instance of threat model 260 may also be executed at central server 280, as represented by threat model 282. Embodiments of the invention may implement central server 280 using techniques discussed in U.S. Pat. No. 9,203,862, entitled "Centralized Storage and Management of Malware Manifests," invented by Rahul C. Kashyap et al., the contents of which are hereby incorporated by reference for all purposes as if fully set forth herein.

Monitoring Process Execution in the Host Operating System

Figure 3:
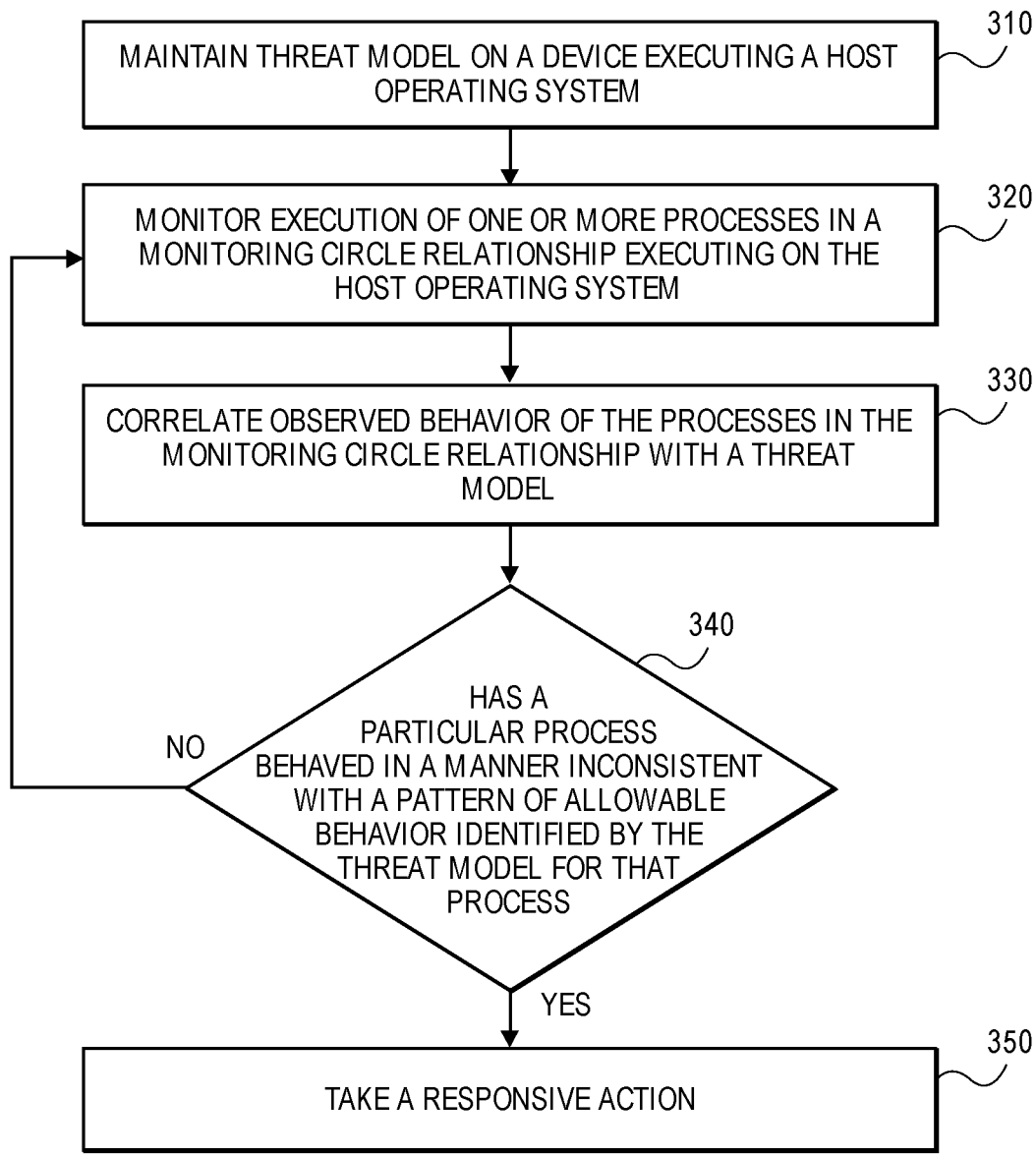
FIG. 3 is a flowchart of the steps of monitoring the execution of processes in a host operating system according to an embodiment of the invention.

FIG. 3 is a flowchart of the steps of monitoring the execution of processes in a host operating system according to an embodiment of the invention. The steps of FIG. 3 will be explained below with reference to the embodiment depicted in FIG. 2.

In step 310, threat model 260 is maintained on computer system 200 which executes host operating system 210. In doing so, threat model 260 may be implemented such that it executes within host operating system 210.

In step 320, monitor 220 observes the execution of a plurality of processes executing in host operating system 210. In an embodiment, upon monitor 220 determining that a first process not being observed is in a monitoring circle relationship with a second process already being monitored, then the first process will become observed by monitor 220 in conjunction with the second process by virtue of the first process being in a monitoring circle relationship with the second process.

A parent process is in a monitoring circle relationship with a child process. For example, if process A is a parent process of process B by virtue of process A initiating the execution of process B, then process A and B are in a monitoring circle relationship. Any process that communicates or interacts with a member of a monitoring circle relationship becomes, as a result, a member of that monitoring circle relationship. Continuing with this example, if process B subsequently communicates with process C, then process A, B, and C are in a monitoring circle relationship. Any process instantiated by a present member of the monitoring circle relationship also joins the monitoring circle relationship. In continuance of this example, if process C initiates the execution of process D, then processes A, B, C, and D are in the monitoring circle relationship. The policy rationale for process D joining the monitoring circle relationship is that process B, in communicating with process C, may have caused or influenced the process C to instantiate process D, and so process D should be monitored in conjunction with process B for possible collusion.

In the embodiment shown in FIG. 2, step 320 may be performed by monitor 220 directly observing the execution of a plurality of processes executing in host operating system 210. As a result of observing host operating system 210, monitor 220 will generate a set of events which are supplied as input to threat model 260.

In step 330, the observed behavior of processes in the monitoring circle relationship is correlated with threat model 260. In this way, threat model 260 may function to selectively determine what events occurring in host operating system 210 are important or worthy of further consideration and/or responsive action.

Threat model 260 may be designed to model expected or allowable behavior of executable code, interpreted data, and user actions. Any sequence of events performed, caused, or associated with a single process or a plurality of processes in a monitoring circle relationship which deviates from the expected or allowable behavior for that process or collection of processes may be considered inconsistent with a pattern of allowable behavior as defined by threat model 260.

In step 340, a determination is made as to whether, as a result of performing step 330, a particular process being observed has behaved in a manner inconsistent with a pattern of allowable behavior as identified by threat model 260. If this result is negative, then processing proceeds to step 320 so that all processes executing in host operating system 210 are continually monitored and observed.

On the other hand, upon determining that a particular process being observed has behaved in a manner inconsistent with a pattern of allowable behavior, then in step 350 a responsive action is taken. Embodiments may be configured to perform a variety of different responsive actions. The following description of responsive actions is by no means mutually exclusive, as embodiments may choose to perform any number of the following responsive actions based on a case by case basis.

One potential responsive action which may be taken in step 350 is that central server 280 may be notified that a particular process in host operating system 210 on device 200 has been observed behaving in a manner inconsistent with a pattern of allowable behavior. Embodiments may provide central server 280 with information describing the behavior of the observed particular process as well as any process in a monitoring circle relationship with that particular process. For example, an embodiment may transmit, from device 200 to central server 280 over network 270, event data that identifies the events caused by the particular process to central server 280. Such event data may be, but need not be, expressed as one or more XML documents. In this fashion, central server 280 may receive event data from a plurality of computer systems Certain embodiments may be configured to transmit such event data to central server 280 only in cases where the event data describes activity deemed sufficiently suspicious or malicious by threat model 260 as to exceed a specified threat level. In this way, central server 280 may be less likely to be inundated by event data received from a plurality of different computer systems.

Upon receipt of event data, central server 280 may analyze and review the received event data from a plurality of computer systems to ascertain if any patterns of use inconsistent with allowable behavior are ascertainable. To illustrate, central server 280 may comprise another instance of threat model 260, as represented by threat model 282 in FIG. 2. Threat model 282 may review and evaluate process behavior described by event data using the same considerations (for example, threat model 282 may serve as a backup or second check) as threat model 260 or may use a different set of considerations as threat model 260 (for example, threat model 282 may focus on patterns of misuse or malicious intent that might develop or be detectable across multiple computer systems).

Embodiments of the invention may also, in taking a responsive action in step 350, severe or terminate a network connection or secure network transport such as a Transport Layer Security (TLS) connection between host operating system 210 and end points on network 270, such as central server 280, if host operating system 210 is determined to possess one or more processes which are behaving inconsistently with a pattern of allowable behavior. This policy behind such action is to prevent any malware from propagating out of host operating system 210 if host operating system 210 is infected with malicious code. A second policy rationale for this responsive action is to help limit the resources which any user acting in an unauthorized manner can access.

Embodiments of the invention may also, in taking a responsive action in step 350, severe or terminate a network connection or secure network transport such as a Transport Layer Security (TLS) connection between host operating system 210 and end points on network 270, such as central server 280. This policy behind such action is to prevent any secrets used in encrypting event data prior to transmit to central server 280 are kept here safe so as to prevent such secrets from being misappropriated from any malware in host operating system 210.

Embodiments of the invention may also, in taking a responsive action in step 350, encrypt and persistently store the event data. Certain embodiments may persistently store event data associated with one or more processes in a manner that evidences the attempt to persistently store the set of events regardless of whether or not the attempt is successful. As host operating systems may be involving in writing all data to a hard-disk drive, host operating system 210 may be involved in writing data to disk even if protected environment 250 is the initiator. However, if host operating system 210 is compromised by malware, there exists a possibility that host operating system 210 may, at the instruction of malware, fail to persistently store event data as doing so would evidence the malware infection. Thus, it is advantageous to be able to detect whether host operating system 210 is not persistently storing event data which host operating system 210 was instructed to store. To do so, threat model 260 may store information, such as a MAC code, which could evidence that event data was attempted to be persistently stored and which may be used to indicate whether any written event data was tampered with. If written event data was tampered with by malware, then the MAC codes for the event data would not match.

It is a possibility that if host operating system 210 were to be compromised by malicious code, host operating system 210 could be caused to malfunction or crash. Embodiments of the invention may, in taking a responsive action in step 350 directed to address this possibility, may establish a protected environment, such as but not limited to a virtual machine or secure execution environment or mode, so that the protected environment has an opportunity to execute after a crash of host operating system, possibly for a limited time to perform a specific set of functions. Such specific set of functions may include ensuring that a log of information, such as event data describing recent activity which occurred in host operating system 210, was persistently stored or transmitted to central server 280. When the computer system subsequently reboots or is powered on, embodiments of the invention may retrieve certain information from a persistent storage to verify that event data describing recent activity which occurred in host operating system 210, was persistently stored or transmitted to central server 280. To do so, a message authentication code and a secure hash corresponding to a set of event data and an optionally MAC address of where the event data may be stored may be stored in a location at which host operating system 210 cannot tamper, such as locations in the BIOS such as the Trusted Platform Module (TPM), management engine (MA), or a UEFI firmware variable. While the entire set of event data could not be stored in the BIOS, a MAC address, message authentication code and a secure hash could be stored in such a location.

Embodiments of the invention may also, in taking a responsive action in step 350, blocking certain suspicious activity at the file and/or network level.

Hardware Mechanisms

Figure 4:
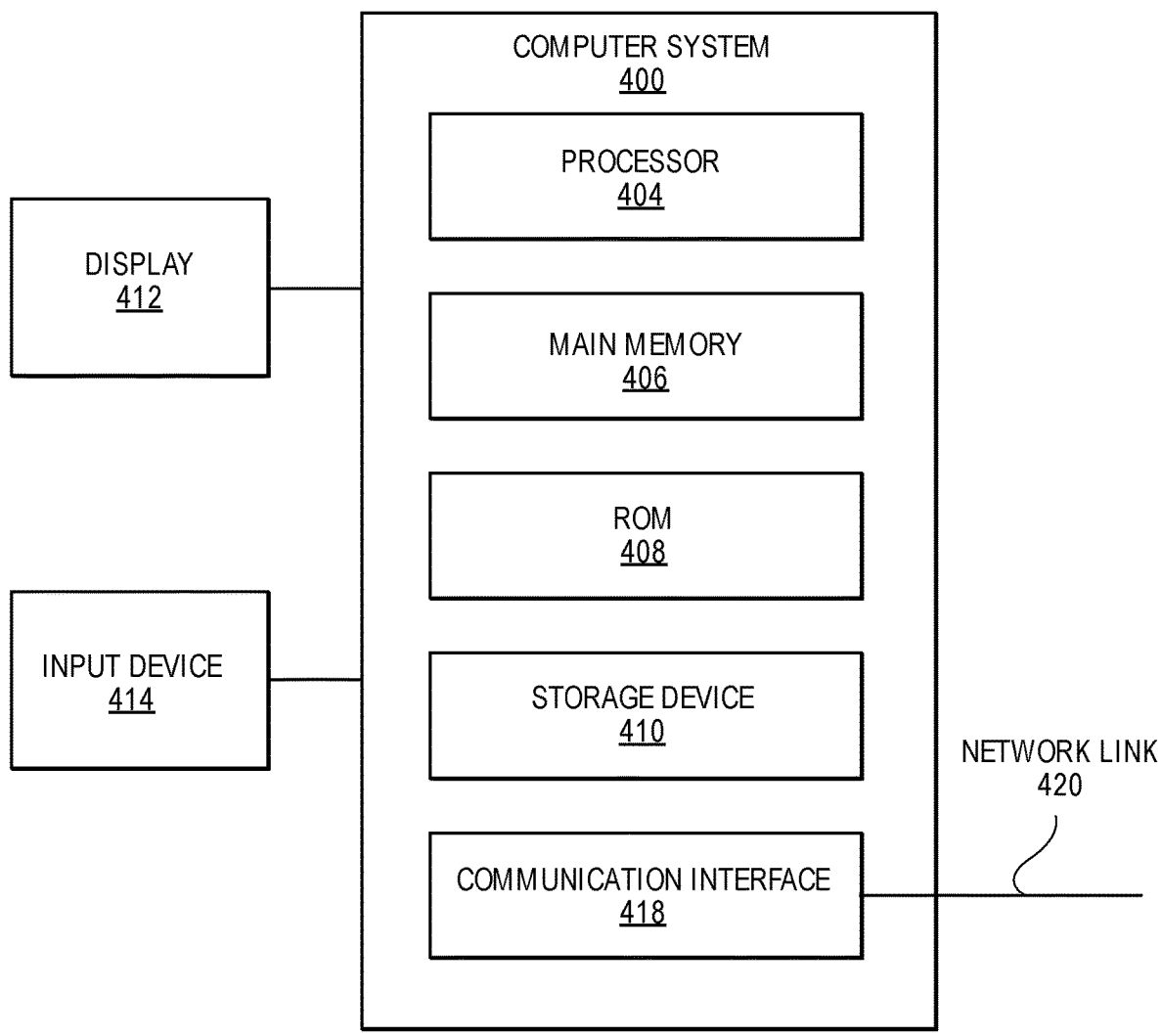
FIG. 4 is a block diagram that illustrates the hardware components of a computer system upon which an embodiment of the invention may be implemented.

Computer system 200 of FIG. 2 may be implemented on any type of computer system capable of executing a host operating system 210. FIG. 4 is a block diagram that illustrates a computer system 400 upon which an embodiment of the invention may be implemented. In an embodiment, computer system 400 includes processor 404, main memory 406, ROM 408, storage device 410, and communication interface 418. Computer system 400 includes at least one processor 404 for processing information. Computer system 400 also includes a main memory 406, such as a random access memory (RAM) or other dynamic storage device, for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device for storing static information and instructions for processor 404. A storage device 410, such as a magnetic disk or optical disk, is provided for storing information and instructions.

Computer system 400 may be coupled to a display 412, such as a cathode ray tube (CRT), a LCD monitor, and a television set, for displaying information to a user. An input device 414, including alphanumeric and other keys, is coupled to computer system 400 for communicating information and command selections to processor 404. Other non-limiting, illustrative examples of input device 414 include a mouse, a trackball, or cursor direction keys for communicating direction information and command selections to processor 404 and for controlling cursor movement on display 412. While only one input device 414 is depicted in FIG. 4, embodiments of the invention may include any number of input devices 414 coupled to computer system 400.

Embodiments of the invention are related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory machine-readable storage medium" as used herein refers to any tangible medium that participates in persistently storing instructions which may be provided to processor 404 for execution. Storage device 410 may correspond to a non-transitory machine-readable storage medium. Non-limiting, illustrative examples of non-transitory machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory machine readable media may be involved in carrying one or more sequences of one or more instructions to processor 404 for execution. For example, the instructions may initially be carried on a magnetic disk of a remote computer. The remote computer can load the instructions into its dynamic memory and send the instructions over a network link 420 to computer system 400.

Communication interface 418 provides a two-way data communication coupling to a network link 420 that is connected to a local network. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through a local network to a host computer or to data equipment operated by an Internet Service Provider (ISP).

Computer system 400 can send messages and receive data, including program code, through the network(s), network link 420 and communication interface 418. For example, a server might transmit a requested code for an application program through the Internet, a local ISP, a local network, subsequently to communication interface 418. The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium storing one or more sequences of instructions for monitoring a host operating system, which when executed, cause:
storing and maintaining, on the host operating system, a threat model that identifies, for any process executing on the host operating system, how trustworthy the process should be deemed based on a pattern of observed behavior for the process;
monitoring execution of a particular process and those processes in a monitoring circle relationship with the particular process, wherein the monitoring circle relationship includes a parent process to the particular process, any process in communication with a member of monitoring circle relationship, and any process instantiated by a present member of monitoring circle relationship;
correlating observed behavior of the particular process and those processes in the monitoring circle relationship with the threat model,
wherein monitoring execution of the particular process and correlating observed behavior are performed by one or more drivers executing on the host operating system that do not appear on a list of loaded drivers; and
upon determining that the particular process has behaved in a manner inconsistent with a pattern of allowable behavior identified by the threat model for that process, taking a responsive action.

2. The non-transitory computer-readable storage medium of claim 1, wherein the set of allowable behavior for the particular process is based, at least in part, upon characteristics inherited from the parent process and other members of the monitoring circle relationship.

3. The non-transitory computer-readable storage medium of claim 1, wherein monitoring execution of the particular process comprises:
transmitting event data that identifies events caused by said particular process to a central server, wherein the central server stores sets of event data received from a plurality of computer systems.

4. The non-transitory computer-readable storage medium of claim 3, wherein transmitting event data is only performed for event data deemed sufficiently suspicious or malicious by the threat model as to exceed a specified threat level.

5. The non-transitory computer-readable storage medium of claim 3, wherein the threat model is a first threat model, and wherein the central server correlates the received event data from the plurality of computer systems against a second threat model maintained by the central server.

6. The non-transitory computer-readable storage medium of claim 1, wherein the threat model models behavior of executable code, interpreted data, and user actions.

7. The non-transitory computer-readable storage medium of claim 1, wherein the responsive action comprises blocking one or more files associated with said particular process at one or more of a file level and a network level.

8. The non-transitory computer-readable storage medium of claim 1, wherein the responsive action comprises:
attempting to persistently store a set of events associated with the particular process in a manner that evidences the attempt to persistently store the set of events regardless of whether or not the attempt is successful.

9. An apparatus for monitoring a host operating system, comprising:
one or more processors; and
one or more non-transitory computer-readable storage mediums storing one or more sequences of instructions, which when executed, cause:
storing and maintaining, on the host operating system, a threat model that identifies, for any process executing on the host operating system, how trustworthy the process should be deemed based on a pattern of observed behavior for the process;
monitoring execution of a particular process and those processes in a monitoring circle relationship with the particular process, wherein the monitoring circle relationship includes a parent process to the particular process, any process in communication with a member of monitoring circle relationship, and any process instantiated by a present member of monitoring circle relationship;
correlating observed behavior of the particular process and those processes in the monitoring circle relationship with the threat model,
wherein monitoring execution of the particular process and correlating observed behavior are performed by one or more drivers executing on the host operating system that do not appear on a list of loaded drivers; and
upon determining that the particular process has behaved in a manner inconsistent with a pattern of allowable behavior identified by the threat model for that process, taking a responsive action.

10. The apparatus of claim 9, wherein the set of allowable behavior for the particular process is based, at least in part, upon characteristics inherited from the parent process and other members of the monitoring circle relationship.

11. The apparatus of claim 9, wherein monitoring execution of the particular process comprises:
transmitting event data that identifies events caused by said particular process to a central server, wherein the central server stores sets of event data received from a plurality of computer systems.

12. The apparatus of claim 11, wherein transmitting event data is only performed for event data deemed sufficiently suspicious or malicious by the threat model as to exceed a specified threat level.

13. The apparatus of claim 11, wherein the threat model is a first threat model, and wherein the central server correlates the received event data from the plurality of computer systems against a second threat model maintained by the central server.

14. The apparatus of claim 9, wherein the threat model models behavior of executable code, interpreted data, and user actions.

15. The apparatus of claim 9, wherein the responsive action comprises blocking one or more files associated with said particular process at one or more of a file level and a network level.

16. The apparatus of claim 9, wherein the responsive action comprises:
attempting to persistently store a set of events associated with the particular process in a manner that evidences the attempt to persistently store the set of events regardless of whether or not the attempt is successful.

17. A method for monitoring a host operating system, comprising:
storing and maintaining, on the host operating system, a threat model that identifies, for any process executing on the host operating system, how trustworthy the process should be deemed based on a pattern of observed behavior for the process;

monitoring execution of a particular process and those processes in a monitoring circle relationship with the particular process, wherein the monitoring circle relationship includes a parent process to the particular process, any process in communication with a member of monitoring circle relationship, and any process instantiated by a present member of monitoring circle relationship;

correlating observed behavior of the particular process and those processes in the monitoring circle relationship with the threat model, wherein monitoring execution of the particular process and correlating observed behavior are performed by one or more drivers executing on the host operating system that do not appear on a list of loaded drivers; and upon determining that the particular process has behaved in a manner inconsistent with a pattern of allowable behavior identified by the threat model for that process, taking a responsive action.

\* \* \* \* \*